Patented Feb. 6, 1934

1,946,054

UNITED STATES PATENT OFFICE 1,946,054

PROCESS OF PREPARING PIGMENTS

Julian T. Baldwin, West Chester, Pa., assignor to Sandura Company, Inc., Paulsboro, N. J., a corporation of New Jersey No Drawing. Original application September 27, 1930, Serial No. 484,937. Divided and this application January 18, 1932. Serial No. 587,453

3 Claims. (Cl. 134—58)

This invention relates to improvements in the manufacture of pigments.

Among other features of the invention it is desired to so modify the surface energy characteristics of ordinary pigments as to give these pigments greatly improved qualities not hitherto attainable.

The present invention is a division of my copending application Serial No. 484,937, filed September 27, 1930, and a continuation in part of my application Serial No. 399,394, filed October 12, 1929.

The present application distinguishes over Serial No. 399,394 in that it discloses coatings of soaps of oxidized fatty acids.

Heretofore the qualities of pigments have depended largely on the materials from which the pigments have been made, and on the manner of making them. By the process of the present invention, on the other hand, any kind of pigment, no matter how it has been made, may be treated by a process entirely separate from and independent of its own manufacture, whereby its qualities become greatly improved.

Some of the advantages of pigments treated in accordance with the present invention are:
1. Better color tone;
2. Greater ease of dispersion;
3. Control of yield value in plastic systems;
4. Better adhesion between pigment and binder or vehicle;
5. Better distribution of particle size;
6. Greater abrasion resistance and tensile strength of their plastics;
7. Smoother and glossier paints and plastics; and
8. Easy removal of moisture.

The surface energy characteristics of pigments play an important part in determining the properties of the pigment when in contact with a binding medium. Settling, cohesion, flocculation, gloss, weathering and abrasion resistance are all functions of the surface energy characteristics. Thus a lead paint on exposure chalks while a zinc oxide paint fails by cracking largely due to the different surface energy characteristics of the two pigments.

Pigments may have their surface energy characteristics greatly modified by coating their surfaces with a thin film of certain organic compounds. However it is very necessary that the material used for coating the pigment remain at the pigment binder interface if it is to have the desired effect. If the material is removed by the binding agent from the interface as would be an ordinary resin if it were used for coating, its effect would only be the same as if the same amount of resin was originally dissolved in the oil or binding medium. Or if the pigment were coated with an oil and the oil subsequently oxidized, the adhesion between the pigment and the oil in a paint would be very much the same as if the oil had been added to the pigment in the usual manner. That is, the interface would be between oil and pigment whether the pigment was added to the oil all at once or if the surface of pigment had been covered with oil which was then oxidized and the resulting coated pigment added to the main body of oil to form the paint.

I have found however that the most desirable and permanent modification of the surface energy characteristics is obtained by causing precipitated suspensions of water repellent metallic organic compounds to become adherent upon the surface of the pigment in the form of a thin film covering each pigment particle. In the first place, the most desirable metallic organic compounds as zinc stearate, calcium oleate or aluminium stearate or resinate are insoluble in water and water repellent. And then it does not seem advisable to coat a pigment with a water soluble coating that is permanent since this would greatly destroy the waterproof qualities of the paint film, linoleum or rubber product. In order to reduce the tendency for these metallic compounds to be removed from the pigment binder interface it is sometimes advisable to precipitate glue or calcium caseinate in conjunction with them. These materials are rendered insoluble in water to secure their precipitation. The coating material is always of different derivation from the pigment itself, being formed by a process entirely separate and independent from the process of chemical formation of the pigment.

The general procedure in treating pigments by my process is to place the pigment in an aqueous suspension containing a potassium or sodium or other organic water dispersible compound in a quantity equivalent to form a soap 0.2% to 2% of the weight of the pigment introduced. This suspension of pigment is well mixed or may be ground in a colloid mill. Then is added the precipitating agent, a metallic salt, in a proportion to cause the precipitation of a suspension of the water repellent metallic organic compound formed by the reaction of the precipitating agent on the dissolved or dispersed organic compound.

The proportion of pigment to coating agent depends on the specific surface of the pigment. The larger the specific surface the larger is the amount of coating agent required to cover the surface. Various fillers and pigments including zinc oxide, whiting, titanium pigment, red slate flour, lithopone and titanium calcium pigment are treated by the present process.

It has been found that the soaps of the oxidized fatty acids of the vegetable oils are particularly well adapted for use as coatings for pigment or filler particles. This is because they are much less soluble in paint vehicles than soaps made from the usual unoxidized acids. Also, these soaps may be polymerized, or made from polymerized oxidized fatty acids. That is, they may be polymerized either after they are made, or the oxidized fatty acid may be polymerized and then made into soap. Pigments coated with the soaps made from these oxidized fatty acids will retain their coating indefinitely, while if pigments are coated with the soaps of the unoxidized fatty acids, this coating is somewhat unstable and liable to be dissolved in the paint vehicle.

The method of applying these soaps as a coating to pigments is by precipitating the soap upon the pigment from an aqueous medium containing the pigment in suspension, and has been set forth in detail in my copending application, Serial No. 399,394, filed October 12, 1929.

An example of the present process is as follows: A pigment is suspended in water and to the suspension is added a water soluble soap of an oxidized fatty acid such as oxidized linoleic acid. The mixture is agitated or ground in a colloid mill. Then a solution of a zinc salt such as zinc sulphate or chloride is added. Other compounds of the type including for instance ferric chloride and barium hydroxide, which will react with a water soluble soap to form a water insoluble soap may be added. The water soluble soap and the salt or precipitating agent are so proportioned that the film formed on the pigment is about 0.2% to 2% of the weight of the pigment. The resulting material is agitated thoroughly or ground in a colloid mill. The pigment is allowed to settle, is washed, filtered and dried according to the usual practice. The pigment having on its surface a thin film comprising a soap of an oxidized fatty acid, is ready for use.

Oxidized fatty acids are prepared by saponifying "scrim oil" with lye or alcoholic potash and acidifying with hydrochloric acid. The resultant mixture is agitated with petroleum ether. The oxidized fatty acids then collect as sediment in the petroleum ether layer, or adhere to the sides of the vessel.

The soap formed from "scrim oil", which contains generally 50-65% oxidized fatty acids, will do satisfactorily in place of the soap made from the purified fatty acids.

Besides "scrim oil" made from linseed oil, "scrim oil" made from china wood oil, or other drying or semi-drying vegetable oils may be used. Other processes besides the "scrim" process may be used to secure the required oxidation of the oil.

It has been found that by using my process of treating pigment surfaces with water repellent materials the usual process of freeing the pigment from water by evaporation may be done away with. In place of this expensive evaporation process, pigment which has been treated by my process may be freed from water by simply adding linseed oil to the wet pigment. My process has decreased the affinity of the pigment for water and increased the affinity for oil, so that the oil replaces the water, and the water is forced to the top of the suspension in a clear layer, and is removed by decantation.

What I claim is:

1. The process of forming an adherent water repellent coating on the surface of a pigment which comprises dissolving a water soluble soap of an oxidized fatty acid in an aqueous suspension of a pigment, adding a metallic salt of the type which will react with the water soluble soap to form a water insoluble soap whereby the water insoluble soap of an oxidized fatty acid will be precipitated on the suspended pigment and form a coating on the pigment, and removing the pigment from the suspending medium in the form of individual particles thinly coated with said water insoluble soap of an oxidized fatty acid.

2. The process of forming an adherent water repellent coating on the surface of a pigment which comprises dissolving an alkali metal salt of oxidized linoleic acid in an aqueous suspension of a pigment, adding zinc sulphate whereby the zinc salt of the oxidized linoleic acid will be precipitated on the suspended pigment and form a coating on the pigment, and removing the pigment from the suspending medium in the form of individual particles thinly coated with said zinc salt of oxidized linoleic acid.

3. A process of preparing pigment material, which process comprises dissolving a water soluble soap of an oxidized fatty acid in an aqueous suspension of a pigment, adding a metallic salt of the type which will react with the water soluble soap to form a water insoluble soap whereby the water insoluble soap of an oxidized fatty acid is precipitated on the suspended pigment, the water soluble soap and the said metallic salt being so proportioned that a film of the said insoluble soap formed on the pigment is about 0.2% to 2% of the weight of the pigment, and washing and drying the resulting pigment material to form individual particles thinly coated with said water insoluble soap of an oxidized fatty acid.

JULIAN T. BALDWIN.

CERTIFICATE OF CORRECTION.

Patent No. 1,946,054.                                            February 6, 1934.

JULIAN T. BALDWIN.

It is hereby certified that error appears in the printed specification of the above numbered patent requiring correction as follows: Page 2, after line 92, insert the following paragraph:

Wherever the term "pigment" appears in the specification and claims, it is meant to include not only pigments as technically considered, but also all varieties of particles including fillers and other materials of similar nature. Likewise, wherever the word "film" appears in the specification and claims, it is meant to include a group of very small particles of the water-repellent compound contained or carried on the surface of the pigment.

And that the said Letters Patent should be read with this correction therein that the same may conform to the record of the case in the Patent Office.
Signed and sealed this 15th day of May, A. D. 1934.

Bryan M. Battey (Seal)                                                Acting Commissioner of Patents.